June 7, 1938.    W. C. BAUER    2,119,619
FILTERING UNIT FOR LUBRICANT CIRCULATING SYSTEMS OF INTERNAL
COMBUSTION ENGINES HAVING OVERHEAD VALVES
Filed Dec. 31, 1936
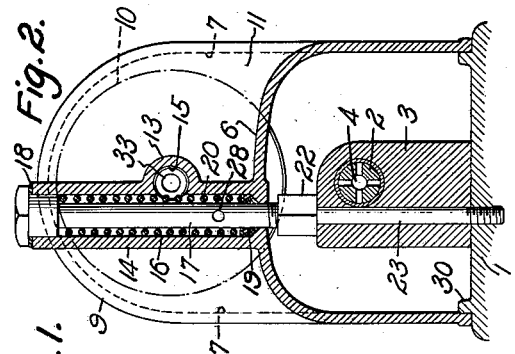
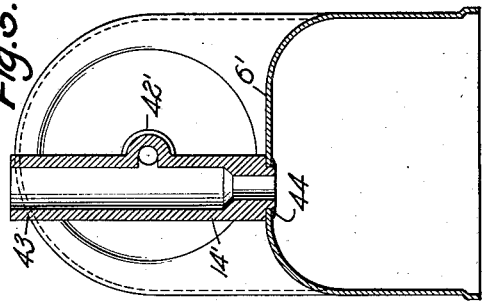
Inventor:
Walter C. Bauer,
By Potter, Pierce & Scheffler
Attorneys.

Patented June 7, 1938

2,119,619

UNITED STATES PATENT OFFICE 2,119,619

FILTERING UNIT FOR LUBRICANT-CIRCULATING SYSTEMS OF INTERNAL COMBUSTION ENGINES HAVING OVERHEAD VALVES

Walter C. Bauer, Rockville, Md.

Application December 31, 1936, Serial No. 118,666

3 Claims. (Cl. 123—196)

This invention relates to lubricant-circulating systems of prime movers, and is concerned more particularly with an improved filtering unit for internal combustion engines, e. g. automotive engines of the overhead valve type. A specific feature of the invention resides in the mounting of such filtering unit.

For an internal combustion engine of the overhead valve type it already has been proposed to mount an oil filter inside of the valve cover; according to that proposal, the oil filter was to be supported over the exposed valve mechanism either by attachment to bolts upstanding from the head of the engine, or by conjoint attachment to such bolts and to a stationary part of said valve mechanism. Such mounting would have been open to a number of objections, which may explain why the proposal had not been accepted by industry: in such case the filter remained fixed to the engine when the valve cover was removed, thereby making it necessary to dismantle the filtering assembly in order to expose the valve mechanism in its entirety; moreover, the proposal made necessary the employment of an oil filter of inherently poor filtering properties.

An object of the present invention is to provide an improved mounting of an oil filter within the valve cover or housing of an internal combustion engine of the overhead valve type, which improved mounting makes possible the employment of a highly efficient oil filter. Another object of the invention is the provision of a filter mounting solely on the inside of the valve cover or housing whereby, upon removal of the bolts used to support the same against movement relative to the engine head, the cover or housing and mounted filter may be removed from the engine head as a unit.

The above and other objects of the invention are realized by modifying the conventional valve cover or housing of a valve-in-head engine whereby to provide a recess or chamber within that part thereof which normally is uppermost, removably mounting an oil filter, in said recess, wholly supported by or from said housing, and providing readily detachable means for leading lubricant, under pressure, to the filtering element of said oil filter, which latter means may be disconnected by removal of one of the valve cover supporting members. More particularly, it is a feature of the present invention to provide in, or connected with, the housing a passage for oil under pressure to the interior of the filtering element, which passage communicates with a passage provided in one of the housing supporting members and, by the latter, with a fixed conduit in communication with the pressure side of the oil pump of the lubricant-circulating system of the engine.

By means of the aforesaid mounting and arrangement, I make it possible to use in the filter an improved type of filtering element such, for instance, as a unitary, molded, block of mineral adsorbent material such as that disclosed in the application of Southwick W. Briggs and Chester G. Gilbert, Serial No. 72,172.

Further objects and advantages of the invention will be apparent from the following detailed description taken in conjunction with the accompanying drawing, in the several figures of which like parts are similarly designated.

In the drawing:

Fig. 1 is a longitudinal sectional elevation of a portion of a valve cover modified in accordance with the invention and showing the same in operative position on an engine;

Fig. 2 is a sectional end elevation taken substantially on the line 2—2 of Fig. 1;

Fig. 3 is an elevation of the opposite end of the cover;

Fig. 4 is a view similar to Fig. 1, illustrating a modified form of the invention; and Fig. 5 is an end view thereof with parts in section.

In the drawing only so much of the valve cover and engine parts is illustrated as is considered necessary to a full understanding of the invention.

In Figs. 1 and 2, a portion of the cylinder head 1 of an automotive engine of the valve-in-head type is shown, in which the rocker arms for operating the engine valves (not shown) are journalled on a rock shaft 2 mounted on bearings or supports 3 carried by the cylinder head 1. The rock shaft 2 is drilled as indicated at 4, to provide oil passages to lubricate the rocker arms and bearings, and oil under pressure is supplied to the rock shaft through a pipe 5 leading from the usual oil pump (not shown) in the crank case of the engine.

In Figs. 1, 2, and 3, the valve cover or housing is shown as a casting, preferably an aluminum casting, and comprises a top wall 6, side walls 7, and end walls 8. The lower edges of the side and end walls of the housing rest upon the cylinder head of the engine. The top wall 6 of the housing is so formed as to provide an upwardly bulged portion which furnishes an appropriate cavity, chamber or recess 9 for a filter unit generally indicated at 10. This filter unit may be supported between the opposed end walls 11 and 12 of the housing 9 in a manner to be explained hereinafter.

It will be understood that the filter unit, preferably of the type hereinbefore referred to, may be interposed anywhere in the lubricant-circulating system wherein the lubricant is under pressure. Hence for facility in furnishing an appropriate connection of the filter unit with said system, connection thereof may be made with the supply pipe 5 in the following manner: The end wall 11 of the housing 9 is provided with an integral boss having a portion 13 in axial alignment with the filter element 10, and a vertical portion 14 laterally offset therefrom. The portions 13 and 14 of the boss are bored as indicated at 15 and 16, respectively, to provide intercommunicating oil-conducting passages, and the bore 16 receives a bolt 17 seating upon a gasket 18 at the top of the portion 14 and extending downwardly through the top wall 6 of the valve cover or housing through a suitable packing 19 upon which latter pressure is exerted by a spring 20 surrounding the bolt 17.

The lower extremity of the bolt 17 is screw-threaded at 21 into the recessed head 22 of an adapter bolt 23 substituted for one of the cap screws 24 customarily employed for attaching its respective rock shaft bearing member 3, and lubricant is supplied to the recess of the adapter bolt head 22 from a T 25, or other appropriate connection interposed in the feed line 5 by means of a pipe 26 leading thereto. The bolt 17 has a bore 27 extending for a portion of its length from the bottom extremity upward, and is counterbored laterally at 28 to provide a passageway through which the lubricant may be forced from the line 5 into the bore 16 and thence through the bore 15 into the interior 29 of the filter unit.

The lubricant thus pumped into the filter unit is filtered as it passes therethrough, and, upon its escape, after being subjected to the filter action, drops down upon the cylinder head 1 of the engine where it is caught in the usual shallow catch-basin 30 and flows therefrom, in the customary manner, back to the sump in the engine crank case for redistribution by the pump.

The filter unit 10 is appropriately supported in the housing 9 by means of two plates or disks 31 and 32 disposed at its opposite end. The plate 31 is preferably supported by means of an integral hollow stud 33 screw-threaded into the bore 15, and the plate 32 is removably supported by means of a set screw 34 preferably provided with a conical end 35 which cooperates with a complementally formed socket 36 centrally disposed in the plate. It will be understood that, once the filter unit 10 has been appropriately positioned within the housing 9, it should not be tampered with, loosened in its mountings, or removed, until it has become inefficient and is ready for replacement, and in order that the set screw 34 may be appropriately adjusted to exert the desired supporting pressure upon the plate 32, and may not be tampered with after such adjustment has been made and the cover positioned upon the engine head, a socket piece 37 is screw-threaded into an opening 38 in the wall 12 of the housing 9 with its stop flange 39 abutting against the inner surface of the wall 12. This socket piece is interiorly bored and screw-threaded at 40 to receive the set screw 34 and accommodate it to desired adjustment, and such adjustment may be fixed by means of a lock nut 41 jammed against the flange 39.

The plates 31 and 32 engage and support upon their peripheries a foraminous shield or cylinder 42 which may be of any appropriate form such as a perforated sheet metal tube or a cylindrical screen.

Obviously, other means than those shown and particularly described may be employed for adjustably supporting the filter unit, but the means of the form illustrated have been found to be well suited to the purpose for which they are designed.

In addition to its function as a means for transferring lubricant from the oil line 5 to the filter unit 10, the bolt 17 is employed also for securing the cover to the cylinder head of the engine, and it is supplemented in this respect by one or more other bolts which pass through the top wall 6 of the cover and are engaged with complemental members carried by the cylinder head, preferably adapters, similar to the bolt 23, associated with others of the rock shaft bearing members.

In the modification of the invention illustrated in Figs. 4 and 5, the cover, instead of being made as a casting, is shown in the form of a sheet metal stamping.

When made of sheet metal, the cover adapts itself to modification whereby some of the elements forming a part of the assembly illustrated in Fig. 1 may be dispensed with. For example, the end wall 11' of the housing may be provided with an inwardly extending boss 31' as a substitute for the plate or disk 31 previously described, and this boss may be provided with a centrally disposed flanged opening 42' to receive an extension of the portion 13' of a casting or the like 43 substituted for the boss of the end wall 11 previously described. Depending upon the metal from which the casting or the like 43 is made, the portion 13' thereof in engagement with the flange of the opening 42 may be either brazed or welded to provide a rigid oil-tight union with the cover, and as illustrated in Fig. 5, this practice may be followed also at the point 44 where the portion 14' of the casting or the like 43 is connected with the top wall 6' of the cover.

The end wall 12' of the housing 9' is formed with a flanged opening 45 in which is welded or brazed an interiorly screw-threaded bushing 46 which receives and supports the parts 34' and 37' corresponding in form and function to the parts 34 and 37 hereinbefore described.

In all other material respects, the sheet metal cover is the equivalent of the cover made as a casting.

As illustrated in Fig. 4, a catch pan 47 provided with a drain 48 may be supported in a suitable manner and position beneath the filter unit 10, so that the filtered oil instead of dropping down into the catch basin 30 of the cylinder head may be caught and returned directly to the crank case sump.

I claim:

1. In combination with an internal combustion engine of the valve-in-head type having a portion of the valve-operating mechanism exposed and having a lubricant-circulating system associated therewith said system including means for delivering lubricant to said valve-operating mechanism and passages for return of lubricant to said system, a housing for the valve-operating mechanism of the engine, said housing being supported on said engine and providing a chamber above said valve-operating mechanism for the reception of a lubricant filtering unit; a lubricant filtering unit; means carried by said housing for mounting said lubricant filtering unit in said chamber; means for diverting lubricant from said system and for leading the same to said lubricant filtering unit, said filtering unit being arranged to deliver filtered lubricant to said passages; and means for securing said housing on said engine, said securing means being constituted by a plurality of bolts, one of said bolts being bored for a part of its length to define a passage for lubricant, in which said housing is provided with inter-communicating lubricant-conducting passages communicating between said lubricant filtering unit and said bored securing bolt one of said passages being adapted for reception of said bored securing bolt, and in which there is provided means defining a passage from said lubricant circulating system to the bore of said bored securing bolt.

2. In combination with an internal combustion engine of the valve-in-head type having a portion of the valve-operating mechanism exposed and having a lubricant-circulating system associated therewith said system including means for delivering lubricant to said valve-operating mechanism and passages for return of lubricant to said system, a housing for the valve-opening mechanism of the engine said housing being supported on said engine and providing a chamber above said valve-operating mechanism for the reception of a lubricant filtering unit; a lubricant filtering unit; means carried by said housing for mounting said lubricant filtering unit in said chamber; means carried by said housing providing lubricant-conducting passages communicating with said filtering unit; a securing bolt for said housing passing through one of said lubricant-conducting passages; a stud secured to the engine and having a recessed head for engagement by said bolt, said bolt having a bore communicating with said recessed head and with one of the lubricant-conducting passages in said housing; and means for conducting lubricant from said system to said recess.

3. In combination with an internal combustion engine of the valve-in-head type having a portion of the valve-operating mechanism exposed and having a lubricant-circulating system associated therewith said system including means for delivering lubricant to said valve-operating mechanism and passages for return of lubricant to said system, a housing for the valve-operating mechanism of the engine, said housing being supported on said engine and forming an enclosure for the valve-operating mechanism, said housing being formed to provide a recessed portion having opposed end walls above said valve-operating mechanism; a lubricant filtering unit mounted in said recess between the end walls thereof; means carried by said housing providing a lubricant-conducting passage opening at one end into said recess through one of the end walls thereof to deliver lubricant to said filtering unit; means carried by said housing providing lubricant-conducting passages communicating with said filtering unit; a securing bolt for said housing passing through one of said lubricant-conducting passages; a stud secured to the engine and having a recessed head for engagement by said bolt, said bolt having a bore communicating with said recessed head and with one of the lubricant-conducting passages in said housing; and means for conducting lubricant from said system to said recess.

WALTER C. BAUER.